United States Patent
Ogasawara et al.

(10) Patent No.: US 9,444,994 B2
(45) Date of Patent: Sep. 13, 2016

(54) IMAGE PICKUP APPARATUS AND METHOD FOR OPERATING IMAGE PICKUP APPARATUS

(71) Applicant: OLYMPUS CORPORATION, Tokyo (JP)

(72) Inventors: Kotaro Ogasawara, Tokyo (JP);
Yutaka Fujisawa, Akishima (JP);
Takehide Fujimoto, Tokyo (JP);
Kiyotaka Kanno, Saitama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/013,085

(22) Filed: Feb. 2, 2016

(65) Prior Publication Data
US 2016/0156835 A1    Jun. 2, 2016

Related U.S. Application Data

(63) Continuation of application No. PCT/JP2014/074914, filed on Sep. 19, 2014.

(30) Foreign Application Priority Data

Oct. 4, 2013   (JP) ................................. 2013-209386

(51) Int. Cl.
*H04N 5/232*    (2006.01)
*H04N 5/225*    (2006.01)

(52) U.S. Cl.
CPC ...... *H04N 5/23212* (2013.01); *H04N 5/23296* (2013.01); *H04N 2005/2255* (2013.01)

(58) Field of Classification Search
CPC .................... H04N 5/23212; H04N 5/23296; H04N 2005/2255
See application file for complete search history.

(56) References Cited

U.S. PATENT DOCUMENTS

2003/0040659 A1*  2/2003  Kazakevich ....... A61B 1/00188
                                                             600/167
2006/0120709 A1*  6/2006  Kobayashi ............. G02B 7/102
                                                             396/80

(Continued)

FOREIGN PATENT DOCUMENTS

EP         2634614 A1    9/2013
JP      2009-133902 A    6/2009

(Continued)

OTHER PUBLICATIONS

International Search Report dated Dec. 22, 2014 issued in PCT/JP2014/074914.

(Continued)

*Primary Examiner* — Twyler Haskins
*Assistant Examiner* — Padma Haliyur
(74) *Attorney, Agent, or Firm* — Scully, Scott, Murphy & Presser, PC

(57) ABSTRACT

An image pickup apparatus is provided with: an objective optical system; an image pickup device; a contrast AF section adjusting a focus so that a peak value of a contrast evaluation value of an image is taken; an amount-of-motion detecting section detecting, from a plurality of time-series images, amounts of motion of the subject; and a control section controlling the contrast AF section so as to calculate another contrast evaluation value in a region where a region to be excluded where an amount of motion is equal to or larger than a threshold is excluded from a calculation target region, and the contrast AF section corrects the other contrast evaluation value based on an area of the calculation target region and an area of the region where the region to be excluded is excluded from the calculation target region.

4 Claims, 3 Drawing Sheets

(56) References Cited

U.S. PATENT DOCUMENTS

| | | | |
|---|---|---|---|
| 2007/0010711 A1* | 1/2007 | Hasegawa | A61B 1/00096 600/168 |
| 2007/0273783 A1* | 11/2007 | Okazaki | H04N 5/23212 348/345 |
| 2007/0293725 A1* | 12/2007 | Hasegawa | A61B 1/00188 600/168 |
| 2008/0218598 A1* | 9/2008 | Harada | H04N 5/2353 348/222.1 |
| 2011/0164868 A1* | 7/2011 | Hamada | G02B 7/365 396/123 |
| 2013/0217965 A1 | 8/2013 | Sasamoto | |

FOREIGN PATENT DOCUMENTS

| | | |
|---|---|---|
| JP | 2010-021597 A | 1/2010 |
| JP | 2010-204585 A | 9/2010 |
| JP | 2012-108313 A | 6/2012 |
| JP | 5253688 B1 | 7/2013 |
| WO | WO 2013/021744 A1 | 2/2013 |

OTHER PUBLICATIONS

Japanese Office Action dated Jul. 7, 2015 issued in JP 2015-516319.

* cited by examiner

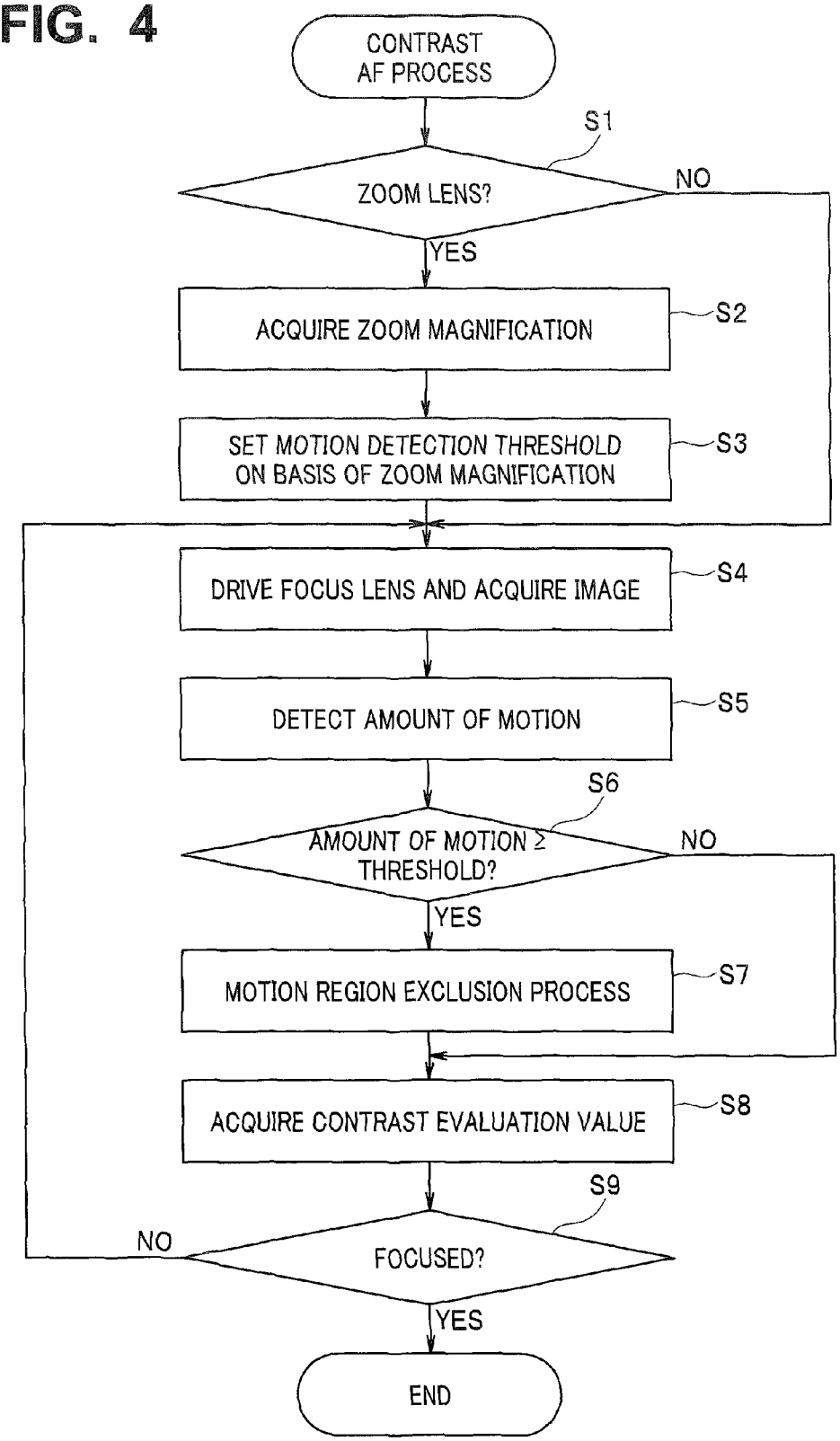

IMAGE PICKUP APPARATUS AND METHOD FOR OPERATING IMAGE PICKUP APPARATUS

CROSS REFERENCE TO RELATED APPLICATION

This application is a continuation application of PCT/JP2014/074914 filed on Sep. 19, 2014 and claims benefit of Japanese Application No. 2013-209386 filed in Japan on Oct. 4, 2013, the entire contents of which are incorporated herein by this reference.

BACKGROUND OF THE INVENTION

1. Field of the Invention

The present invention relates to an image pickup apparatus which acquires a plurality of images while causing a focus position to change and adjusts the focus position so that a peak value of contrast evaluation values is taken, and a method for operating the image pickup apparatus.

2. Description of the Related Art

As range finding systems for acquiring information about a distance to a subject, an active system in which infrared light or ultrasound is radiated to a subject to detect a distance on a basis of a time period required until a reflected wave returns or a radiation angle, and a passive system in which an image acquired via an optical system is used to perform range finding without using infrared light and the like are known.

Among the systems, examples of the passive system include phase difference AF (autofocus) used in a single-lens reflex camera and the like and contrast AF widely used in a video camera, a compact camera and the like. The phase difference AF requires, for example, an AF sensor. Therefore, in a small-sized image pickup apparatus such as an endoscope, the contrast AF in which an image picked up by an image pickup section can be used to perform AF is relatively widely used.

The contrast AF is an AF system in which a plurality of (generally, three or more) frame images are acquired while a focus lens is driven and a focus position is being changed, and a focus position where a maximum (peak) contrast evaluation value among contrast evaluation values of the acquired images (for example, high-frequency components of the images) is obtained is set as a focal point. Various techniques related to such contrast AF have been conventionally proposed.

For example, Japanese Patent Application Laid-Open Publication No. 2009-133903 describes a technique in which detection of a peak position on a basis of contrast of images is not performed when motion of an object is fast, and, by successively performing movement to a predicted focus position, motion of a focus lens is caused to follow the motion of the object in a state that some level of focusing accuracy is secured.

Further, Japanese Patent Application Laid-Open Publication No. 2012-108313 describes a technique in which a first focusing processing section and a second focusing processing section are provided, and, when it is judged that focusing by the first focusing processing section has been performed, processing is switched from the first focusing processing section to the second focusing processing section. Here, the first focusing processing section is, for example, contrast AF focusing processing section. On the other hand, the second focusing processing section is a focusing processing section which performs AF based on average luminance of images, a focusing processing section which performs AF based on frequency characteristics of luminance images, a focusing processing section which performs AF based on motion vectors detected from local regions of luminance images, or the like.

Furthermore, Japanese Patent Application Laid-Open Publication No. 2010-204585 describes a technique in which detection of motion of an object image is also performed when contrast AF is performed, and, though a position is changed on a basis of a motion detection result for a focus detection region, the position is changed on a basis of a result of addition of motion detections for an AF frame, and the AF frame is changed with a characteristic different from a characteristic for the focus detection region to suppress a feeling of flickering which occurs at time of causing the AF frame to move.

SUMMARY OF THE INVENTION

An image pickup apparatus according to a certain aspect of the present invention is provided with: an objective optical system including a focus lens for causing a focus position to change, the objective optical system forming an optical image of a subject; an image pickup device picking up the optical image and outputting an image; a contrast AF section causing the image pickup device to acquire a plurality of images while causing the focus position to change, calculating a contrast evaluation value of each of the acquired images, and adjusting the focus position so that a peak value of the contrast evaluation value is taken; an amount-of-motion detecting section detecting, from the plurality of images acquired in a time series by the image pickup device, an amount of motion of the subject in each region in the images; a control section detecting a region to be excluded where the amount of motion is equal to or larger than a predetermined threshold, and controlling the contrast AF section so as to calculate another contrast evaluation value in a region where the region to be excluded is excluded from a calculation target region of the contrast evaluation value, wherein the contrast AF section corrects the other contrast evaluation value, based on an area of the calculation target region and an area of the region where the region to be excluded is excluded from the calculation target region.

A method for operating an image pickup apparatus according to a certain aspect of the present invention includes steps of: an objective optical system comprising a focus lens for causing a focus position to change forming an optical image of a subject; an image pickup device picking up the optical image and outputting an image; a contrast AF section causing the image pickup device to acquire a plurality of images while causing the focus position to change, calculating a contrast evaluation value of each of the acquired images, and adjusting the focus position so that a peak value of the contrast evaluation value is taken; an amount-of-motion detecting section detecting, from the plurality of images acquired in a time series by the image pickup device, an amount of motion of the subject in each region in the images; a control section detecting a region to be excluded where the amount of motion is equal to or larger than a predetermined threshold, and controlling the contrast AF section so as to calculate another contrast evaluation value in a region where the region to be excluded is excluded from a calculation target region of the contrast evaluation value; and the contrast AF section correcting the other contrast evaluation value, based on an area of the calculation target region and an area of the region where the region to be excluded is excluded from the calculation target region.

BRIEF DESCRIPTION OF THE DRAWINGS

FIG. 4 is a flowchart showing a contrast AF process of the image pickup apparatus in the above first embodiment.

DETAILED DESCRIPTION OF THE PREFERRED EMBODIMENTS

An embodiment of the present invention will be described below with reference to drawings.

First Embodiment

Figure 1:
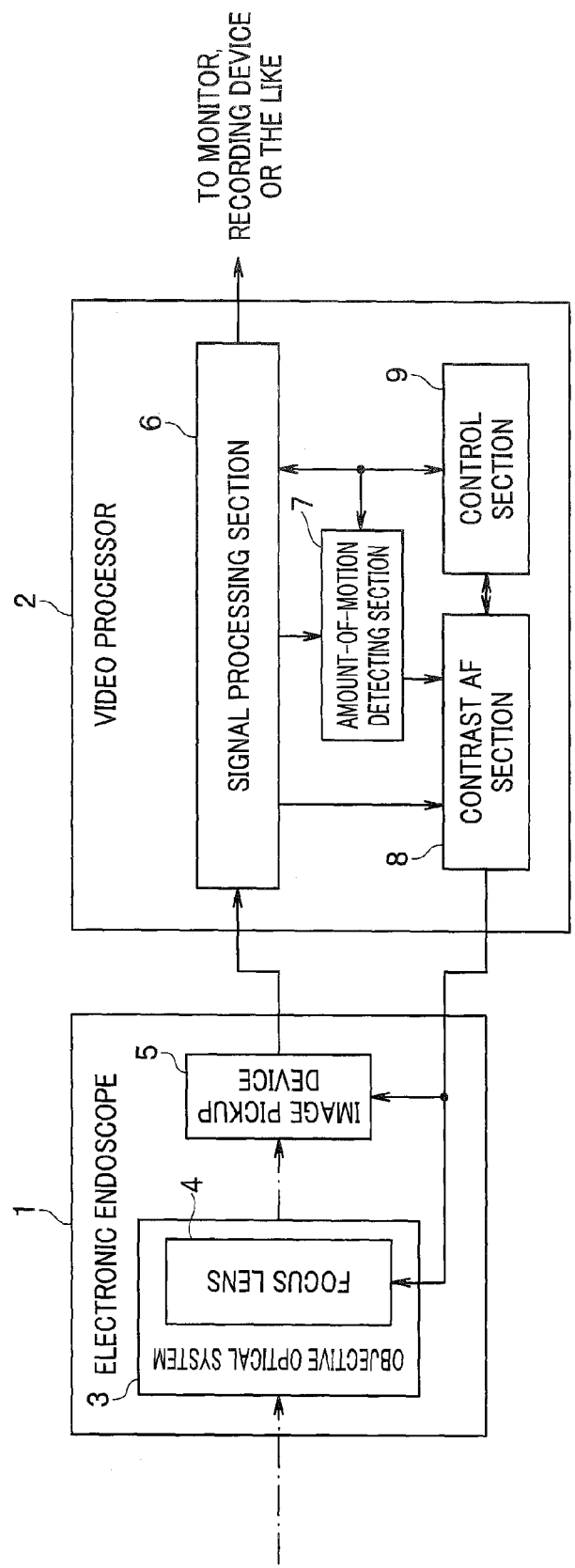
FIG. 1 is a block diagram showing a configuration of an image pickup apparatus in a first embodiment of the present invention.

FIGS. 1 to 4 show a first embodiment of the present invention, and FIG. 1 is a block diagram showing a configuration of an image pickup apparatus.

The image pickup apparatus of the present embodiment is applied to an electronic endoscope system, and the image pickup apparatus is provided with an electronic endoscope 1 and a video processor 2.

The electronic endoscope 1 is provided with an objective optical system 3 which forms an optical image of a subject and an image pickup device 5 which picks up the optical image formed by the objective optical system 3 and outputs an image Here, the objective optical system 3 includes a focus lens 4 for changing a focus position. Note that the objective optical system 3 may be configured as a zoom optical system which includes a zoom lens.

The image pickup device 5 acquires a plurality of images in a time series on a basis of control of a contrast AF section 8 as described later.

Further, the video processor 2 is provided with a signal processing section 6, an amount-of-motion detecting section 7, the contrast AF section 8 and a control section 9.

The signal processing section 6 performs image signal processing, such as correlated double sampling (CDS), gain adjustment, conversion from an analog signal to a digital signal, synchronization processing (processing for performing interpolation to change a state that only one color component among three color components constituting a color image exists in one pixel to a state that all the three color components exist in one pixel), white balance adjustment, γ correction processing and color space conversion processing, for an image outputted from the image pickup device 5. An image processed to be displayed, by the signal processing section 6 is outputted to a monitor or the like, and an image processed to be recorded is outputted to a recording device or the like.

From the plurality of images acquired by the image pickup device 5 in a time series (the images may be used as images acquired by the contrast AF section 8 to calculate a contrast evaluation value, which are to be described later), the amount-of-motion detecting section 7 detects an amount of motion of the subject in each region in the images. The amount-of-motion detecting section 7 will be further described with reference to FIG. 2. Here, FIG. 2 is a diagram showing an example of an image when there is a moving body.

Figure 2:
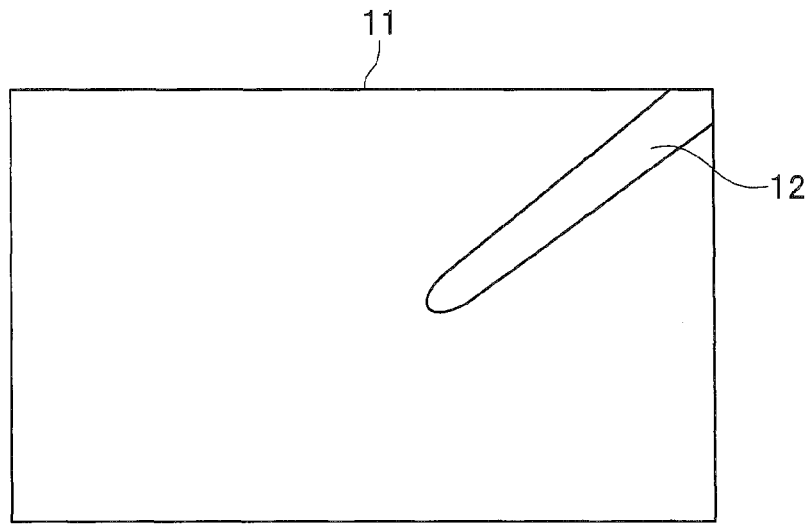
FIG. 2 is a diagram showing an example of an image when there is a moving body in the above first embodiment.

In the example shown in FIG. 2, it is assumed that a moving body 12, such as a forceps and a treatment instrument, exists in an image 11 of a target subject (a subject to which a focus position is desired to be adjusted, for example, an inside of a body cavity).

The amount-of-motion detecting section 7 first performs matching processing for a first image and a second image acquired in a time series (the first image and the second image are assumed to have been acquired in this order) to presumes a same body in the two images. Next, the amount-of-motion detecting section 7 calculates a motion vector (an amount and direction of movement) of the whole image between the first image and the second image as a whole motion vector thought to have been caused by influence of movement of hands on a basis of a matching processing result. Furthermore, the amount-of-motion detecting section 7 removes a whole motion vector component from the second image, and presumes a body in the second image after the removal which has moved from the first image to be a moving body 12. Then, the amount-of-motion detecting section 7 detects an amount and direction of movement of the presumed moving body 12 as a motion vector of the moving body 12.

The control section 9 judges whether or not the amount of motion of the moving body 12 detected by the amount-of-motion detecting section 7 (a magnitude of the motion vector) is equal to or larger than a predetermined threshold. Then, the control section 9 causes the contrast AF section 8 to exclude a region to be excluded, where the amount of motion is equal to or larger than the predetermined threshold, from a contrast evaluation value calculation target region.

Figure 3:
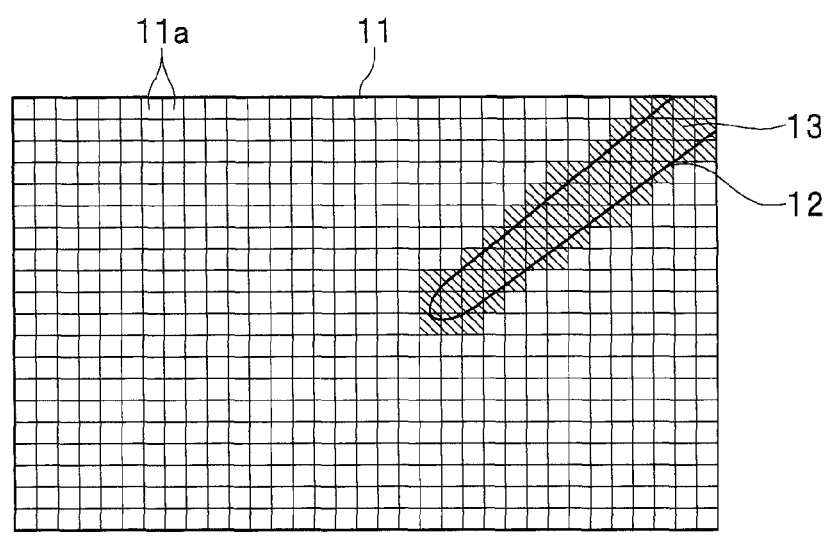
FIG. 3 is a diagram showing that the moving body is excluded from a contrast evaluation value calculation target region in the above first embodiment.

FIG. 3 is a diagram showing that a moving body is excluded from the contrast evaluation value calculation target region.

As for calculation of a contrast evaluation value by the contrast AF section 8, for example, the image 11 is divided into a plurality of regions 11a, and the contrast evaluation value is calculated for each of the divided regions 11a. Therefore, the control section 9 sets a region constituted by a set of regions 11a in which the moving body 12 is included (a region shown by hatching) as a region to be excluded 13.

Further, the control section 9 controls the contrast AF section 8 to cause a plurality of images to be acquired in a time series by the image pickup device 5 while causing a position of the focus lens 4 to move.

The contrast AF section 8 calculates contrast evaluation values of the plurality of images 11 acquired while causing a focus position to change, and causes the position of the focus lens 4 to move to adjust the focus position of the objective optical system 3 so that a peak value of the calculated contrast evaluation values is taken.

It is a region excluding the region to be excluded 13 that is targeted by the contrast evaluation value calculation by the contrast AF section 8, as described above.

That is, the contrast AF section 8 extracts a high-frequency component image, for example, by performing high-pass filtering for the image 11. Then, for all calculation target regions 11a excluding the region to be excluded 13, the contrast AF section 8 adds a high-frequency component value of each of the regions 11a.

When an added value (a contrast addition value) calculated at this time is indicated by SumC, the contrast addition value SumC is a smaller value in the case where the region to be excluded 13 exists in the calculation target region in comparison with the case where the region to be excluded 13 does not exist, and it can be thought that there is a possibility that accuracy of contrast AF is influenced depending on a size of the region to be excluded 13.

Therefore, when an area of the whole calculation target region in the image 11 is indicated by S0, and an area of the calculation target region excluding the region to be excluded 13 is indicated by S1, the control section 9 calculates a correction coefficient R as shown below:

$$R = S0/S1$$

Then, the contrast AF section 8 calculates a contrast evaluation value CEV as an evaluation value independent of the size of the calculation target region, as shown below:

$$CEV = R \times SumC$$

By, with use of the contrast evaluation value CEV calculated in this way, picking up images while causing the focus position to change, performing scanning for searching for a position with a peak contrast evaluation value CEV, and driving the focus lens 4 to the found peak position, focusing is performed.

Note that, at time of determining the contrast addition value SumC, a method of performing weighting for each calculation target region 11a to perform addition may be used instead of simple addition. In this case, however, it goes without saying that the areas S0 and S1 which have been weighted are also used to calculate the correction coefficient R.

Further, though the contrast evaluation value CEV has been calculated with the use of the correction coefficient R, the correction coefficient R may not be calculated when the calculation is not necessary or when the necessity of the calculation is low. Here, as the case where the calculation of the correction coefficient R is unnecessary, for example, such a case is given that, even if the moving body 12 exists in the image 11, a position of the existence is outside the contrast evaluation value calculation target region (because the calculation target region is not necessarily the whole image 11 but may be a part (for example, a central part) in the image 11). Further, as the case where the necessity of the calculation of the correction coefficient R is low, for example, such a case is given that a rate of the area of the region to be excluded 13 in the calculation target region is so small that influence given to the contrast evaluation value CEV can be ignored.

Furthermore, as a method for calculating the evaluation value independent of the size of the calculation target region, a method using an average contrast addition value per unit area as the contrast evaluation value may be adopted instead of the method using the correction coefficient R described above. Alternatively, if there is an image in which the moving body 12 does not exist among past images acquired in temporal proximity, a method of substituting a high-frequency component of a region in the past image corresponding to a region to be excluded 13 in a processing target image (the corresponding region in the past image can be presumed by the matching processing described above) as the high-frequency component of the region to be excluded 13 may be adopted.

Next, FIG. 4 is a flowchart showing a contrast AF process of the image pickup apparatus.

When the process is started, it is judged whether or not the objective optical system 3 is a zoom optical system which includes a zoom lens first (step S1).

If it is judged that the objective optical system 3 is a zoom optical system here, a zoom magnification is acquired (step S2), and a threshold at time of detecting an amount of motion is set on a basis of the acquired zoom magnification (step S3).

Here, even if speed of the moving body 12 is uniform, the amount of movement in an image is small if a zoom position is in a wide region with a wide angle of view, and, on the contrary, the amount of movement in the image is large if the zoom position is in a tele region with a narrow angle of view. Therefore, in order to accurately judge whether or not the amount of motion of the moving body 12 is such an amount of motion that a region is to be set as a region to be excluded 13, a threshold according to a zoom magnification is set here. Therefore, the threshold is generally set so as to be large if the zoom magnification is high (if the zoom position is on a tele side) and small if the zoom magnification is low (if the zoom position is on a wide side).

When the process of step S3 ends or when it is judged at step Si that the objective optical system 3 is not a zoom optical system, the focus lens 4 is driven, and an image is acquired by the image pickup device 5 (step S4). By being repeatedly performed returning from the process in step S9 described later, step S4 performs scanning of acquiring a plurality of images in a time series by the image pickup device 5 while driving the focus lens 4.

Then, the amount of motion is detected by the amount-of-motion detecting section 7 on a basis of the plurality of images acquired in a time series (step S5).

The control section 9 judges whether or not the detected amount of motion is equal to or larger than a predetermined threshold (the threshold set at step S3 if the objective optical system 3 is a zoom optical system) (step S6).

Here, if the amount of motion is equal to or larger than the predetermined threshold, the control section 9 causes the contrast AF section 8 to exclude a region to be excluded 13 where the amount of motion is equal to or larger than the predetermined threshold, from a contrast evaluation value calculation target region (step S7).

If the process of step S7 has been performed, the contrast AF section 8 acquires a contrast evaluation value for the calculation target region excluding the region to be excluded 13. On the contrary, if it is judged at step S6 that the amount of motion is smaller than the predetermined threshold, the contrast AF section 8 acquires a contrast evaluation value for all the calculation target region (step S8).

Then, it is judged whether or not a focused state has been obtained, that is, whether or not the focus position is at a position with a peak contrast evaluation value (step S9). If the focused state has not been obtained yet, the process returns to step S4, and the focus lens 4 is driven to perform the process as described above.

Thus, when it is judged at step S9 that the focused state has been obtained, the contrast AF process is ended.

Note that, though an artifact such as a forceps and a treatment instrument is assumed as the moving body 12 in the above description, the moving body 12 is not limited thereto. For example, a subject site which beats or pulses may be also treated as the moving body 12.

Further, though an example in which an image pickup apparatus is applied to an electronic endoscope system has been described above, the present invention is not limited thereto but can be widely applicable to an apparatus equipped with an image pickup function.

According to the first embodiment as described above, because a region to be excluded 13 where the amount of motion is equal to or larger than a predetermined threshold is removed from a calculation target region of the contrast evaluation value calculation by the contrast AF section 8, it is possible to stably perform focus position adjustment to a target subject without causing focus loss due to a moving body 12 even if the moving body 12 comes into a field of view.

At this time, if the contrast evaluation value is an evaluation value independent of the size of the calculation target region, it is possible to preferably suppress decrease in focus position detection accuracy caused by existence of the region to be excluded 13.

Especially, if a contrast evaluation value CEV is calculated with use of a correction coefficient R determined on a basis of an area ratio between a calculation target region in the case where a region to be excluded 13 exists and a calculation target region in the case where the region to be excluded 13 does not exist, it is possible to suppress the decrease in the focus position detection accuracy only by performing relatively easy operation with a little load.

Further, by using images acquired by the contrast AF section 8 for calculating contrast evaluation values as images used by the amount-of-motion detecting section 7 for detection, it is possible to reduce the number of frames of images to be picked up.

Note that, though description has been made mainly on an image pickup apparatus above, a method for operating the image pickup apparatus is also possible, and a processing program for causing a computer to execute the method for operating the image pickup apparatus, a non-temporary computer-readable recording medium for recording the processing program, and the like are also possible.

Further, the present invention is not limited to the above embodiment immediately as it is, and components can be modified and embodied within a range not departing from spirit of the invention at a stage of practicing the invention. Further, various aspects of the invention can be formed by appropriately combining a plurality of components disclosed in the above embodiment. For example, some components may be deleted from all the components shown in the embodiment. Furthermore, components of different embodiments may be appropriately combined. Thus, it is, of course, possible to make various modifications and applications within the range not departing from the spirit of the invention.

What is claimed is:

1. An image pickup apparatus comprising:
    an objective optical system including a focus lens for causing a focus position to change, the objective optical system forming an optical image of a subject;
    an image pickup device picking up the optical image and outputting an image;
    a contrast AF section causing the image pickup device to acquire a plurality of images while causing the focus position to change, calculating a contrast evaluation value of each of the acquired images, and adjusting the focus position so that a peak value of the contrast evaluation value is taken;
    an amount-of-motion detecting section detecting, from the plurality of images acquired in a time series by the image pickup device, an amount of motion of the subject in each region in the images; and
    a control section detecting a region to be excluded where the amount of motion is equal to or larger than a predetermined threshold, and controlling the contrast AF section so as to calculate another contrast evaluation value in a region where the region to be excluded is excluded from a calculation target region of the contrast evaluation value,
    wherein the contrast AF section corrects the other contrast evaluation value, based on an area of the calculation target region and an area of the region where the region to be excluded is excluded from the calculation target region.

2. The image pickup apparatus according to claim 1, wherein
    the control section calculates a correction coefficient, which is a result of dividing an area of all the calculation target region by an area of the calculation target region after excluding the region to be excluded; and
    the contrast AF section calculates the contrast evaluation value independent of the size of a calculation target region by calculating a contrast addition value for the calculation target region after excluding the region to be excluded and multiplying the contrast addition value by the correction coefficient.

3. The image pickup apparatus according to claim 1, wherein the images used by the amount-of-motion detecting section for detection are the images acquired for calculating the contrast evaluation value.

4. A method for operating an image pickup apparatus, the method comprising steps of:
    an objective optical system comprising a focus lens for causing a focus position to change forming an optical image of a subject;
    an image pickup device picking up the optical image and outputting an image;
    a contrast AF section causing the image pickup device to acquire a plurality of images while causing the focus position to change, calculating a contrast evaluation value of each of the acquired images, and adjusting the focus position so that a peak value of the contrast evaluation value is taken;
    an amount-of-motion detecting section detecting, from the plurality of images acquired in a time series by the image pickup device, an amount of motion of the subject in each region in the images;
    a control section detecting a region to be excluded where the amount of motion is equal to or larger than a predetermined threshold, and controlling the contrast AF section so as to calculate another contrast evaluation value in a region where the region to be excluded is excluded from a calculation target region of the contrast evaluation value; and
    the contrast AF section correcting the other contrast evaluation value, based on an area of the calculation target region and an area of the region where the region to be excluded is excluded from the calculation target region.

* * * * *